United States Patent
Therkelsen

(10) Patent No.: US 12,380,912 B2
(45) Date of Patent: Aug. 5, 2025

(54) AUDIO AUTOMATIC MIXER WITH FREQUENCY WEIGHTING

(71) Applicant: Cisco Technology, Inc., San Jose, CA (US)

(72) Inventor: Asbjorn Therkelsen, Nesbru (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 312 days.

(21) Appl. No.: 17/689,546

(22) Filed: Mar. 8, 2022

(65) Prior Publication Data
US 2023/0290370 A1    Sep. 14, 2023

(51) Int. Cl.
| | |
|---|---|
| *G10L 21/0308* | (2013.01) |
| *G10L 25/18* | (2013.01) |
| *H04R 3/00* | (2006.01) |
| *H04R 5/04* | (2006.01) |

(52) U.S. Cl.
CPC .......... *G10L 21/0308* (2013.01); *G10L 25/18* (2013.01); *H04R 3/005* (2013.01); *H04R 5/04* (2013.01)

(58) Field of Classification Search
CPC ..... G10L 21/0308; G10L 25/18; G10L 21/02; G10L 2021/02166; G10L 25/78; H04R 3/005; H04R 5/04; H04R 27/00; H04R 2420/01; H04R 2430/03; H04R 1/406; H04R 2201/401; H04M 3/567; H04M 2203/509; H04M 3/568
See application file for complete search history.

(56) References Cited

U.S. PATENT DOCUMENTS

| | | | |
|---|---|---|---|
| 3,992,584 A | | 11/1976 | Dugan |
| 4,817,155 A | * | 3/1989 | Briar ....................... G10L 15/00 |
| | | | 704/203 |
| 4,864,627 A | | 9/1989 | Dugan |
| 6,125,343 A | * | 9/2000 | Schuster ............... G10L 21/028 |
| | | | 704/E21.013 |
| 8,160,877 B1 | * | 4/2012 | Nucci ..................... G10L 17/06 |
| | | | 704/247 |

(Continued)

FOREIGN PATENT DOCUMENTS

| | | | | |
|---|---|---|---|---|
| CN | 1375096 A | * | 10/2002 | ......... G10L 19/0204 |
| WO | WO-2016100422 A1 | * | 6/2016 | ............. G10L 19/02 |

OTHER PUBLICATIONS

Vamsynagh Pedamallu, "Microphone Array Wiener Beamforming with emphasis on Reverberation", Blekinge Institute of Technology, Jan. 2012, 73 pages.
Biamp, "Automixer basics", last updated: Aug. 13, 2020, 10 pages, retrieved from Internet Mar. 8, 2022; https://support.biamp.com/General/Audio/Automixer_basics.

(Continued)

*Primary Examiner* — Richemond Dorvil
*Assistant Examiner* — Zeeshan Mahmood Shaikh
(74) *Attorney, Agent, or Firm* — Edell, Shapiro & Finnan, LLC

(57) ABSTRACT

A method is provided that is performed at a system including multiple speech collectors to collect speech from a talker to produce corresponding ones of multiple audio signals that each convey speech energy: for each audio signal: separating high-frequency speech energy from low-frequency speech energy; and determining a first energy level of the high-frequency speech energy; and determining a preferred audio signal among the multiple audio signals for subsequent processing at least based on the first energy level of each audio signal.

20 Claims, 8 Drawing Sheets

(56) References Cited

U.S. PATENT DOCUMENTS

| | | | |
|---|---|---|---|
| 9,363,598 B1 | 6/2016 | Yang | |
| 11,483,646 B1* | 10/2022 | Pan | H04R 3/005 |
| 2005/0175190 A1* | 8/2005 | Tashev | H04R 3/005 |
| | | | 381/91 |
| 2008/0147415 A1* | 6/2008 | Schnell | G10L 21/038 |
| | | | 704/E21.011 |
| 2008/0300702 A1* | 12/2008 | Gomez | G10L 25/48 |
| | | | 700/94 |
| 2009/0274318 A1 | 11/2009 | Ishibashi et al. | |
| 2017/0026740 A1* | 1/2017 | Kirsch | H04M 3/568 |
| 2019/0090052 A1 | 3/2019 | Radmanesh et al. | |
| 2020/0380954 A1* | 12/2020 | Fan | G10L 15/02 |

OTHER PUBLICATIONS

Paul Gunia, "Why Automatic Mixing is Crucial for Conferencing", Shure, Oct. 1, 2018, 7 pages; https://www.shure.com/en-US/conferencing-meetings/ignite/why-automatic-mixing-is-crucial-for-conferencing.

Dan Dugan, "Dugan Automatic Microphone Mixers", Dan Dugan Sound Design, 7 pages, retrieved from Internet Mar. 8, 2022; https://dandugan.com/products/.

Biamp, "Gain Sharing Auto Mixer", 3 pages, retrieved from Internet Mar. 8, 2022; https://tesira-help.biamp.com/Component_Objects/Audio/Mixers/Gain_Sharing_Automixer.htm.

Biamp, "Gain Sharing vs. Gating Automixer", last updated Jul. 25, 2016, 5 pages, retrieved from Internet Mar. 8, 2022; https://support.biamp.com/Tesira/Programming/Gain_Sharing_vs.Gating_Automixer.

* cited by examiner

AUDIO AUTOMATIC MIXER WITH FREQUENCY WEIGHTING

TECHNICAL FIELD

The present disclosure relates to audio automatic (auto)-mixing.

BACKGROUND

Audio capture systems having multiple microphones may include automatic mixers to select among the microphones solely based on an energy or signal level produced by each microphone. In a video collaboration meeting room, this is not always an optimal solution. For example, when a talker is positioned nearest to one of the microphones, but talking in a direction away from the microphone, a different microphone further away from the talker may be a better selection for generating an audio signal to be used for audio processing. A conventional automatic mixer most likely selects the closest microphone because lower audio frequencies detected by the microphone are less directive and have more energy than higher audio frequencies detected by the microphone.

A physical arrangement commonly used in video collaboration meetings includes a table positioned in front of a video endpoint. The video endpoint may employ external microphones that rest on top of the table or are mounted on a ceiling. Participants may sit on opposite sides of the table and talk in a direction toward the video endpoint. Sometimes, a selected microphone to be used to provide an audio signal for audio processing may be located at a 90-degree angle with respect to a talking participant, which disadvantageously causes voiced consonants in speech to be attenuated due to the directivity of high frequency speech energy.

DESCRIPTION OF EXAMPLE EMBODIMENTS

Overview

In an embodiment, a method is provided in which, at a system including multiple speech collectors to collect speech from a talker to produce corresponding ones of multiple audio signals that each convey speech energy, for each audio signal: separating high-frequency speech energy from low-frequency speech energy; and determining a first energy level of the high-frequency speech energy; and determining a preferred audio signal among the multiple audio signals for subsequent processing at least based on the first energy level of each audio signal.

Example Embodiments

Figure 1:
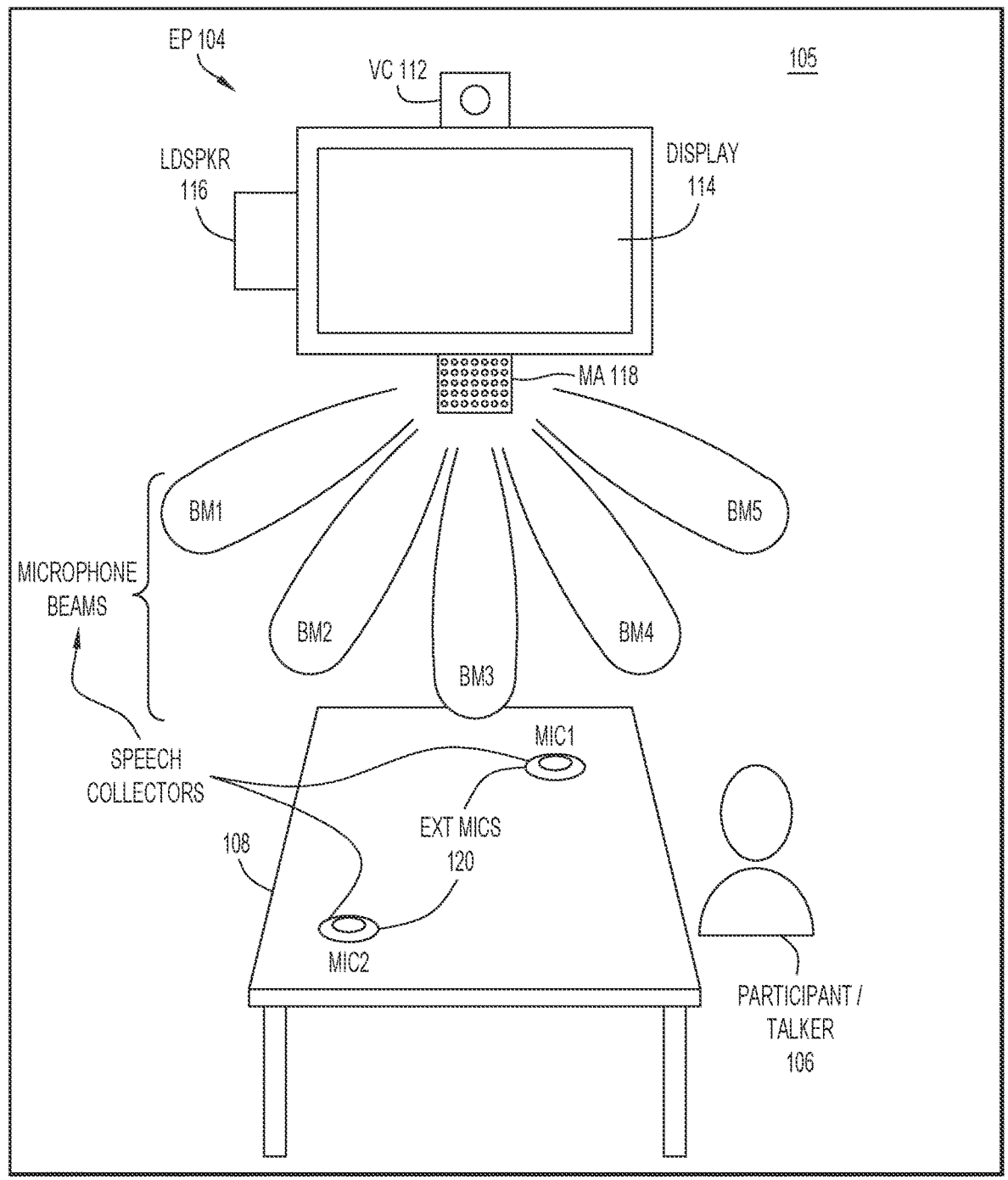
FIG. 1 is an illustration of a video conference (e.g., teleconference) endpoint deployed in a room with a conference participant/talker, according to an example embodiment.

With reference to FIG. 1, there is an illustration of an example video conference (e.g., teleconference) system or endpoint (EP) 104 (referred to simply as "endpoint 104"), in which audio auto-mixing embodiments presented herein may be implemented. Endpoint 104 is deployed in an acoustic environment, such as a conference room 105 (shown simply as an outline in FIG. 1), and operated by a local participant/talker 106 seated adjacent to a table 108. Endpoint 104 is configured to establish audio-visual teleconference collaboration sessions with other endpoints over a communication network (not shown), which may include one or more wide area networks (WANs), such as the Internet, and one or more local area networks (LANs).

Endpoint 104 includes a video camera (VC) 112, a video display 114, a loudspeaker (LDSPKR) 116, and a microphone array (MA) 118. Microphone array 118 may include a two-dimensional array of microphones as depicted in FIG. 1, or, alternatively, a one-dimensional array of microphones. Endpoint 104 also includes individual external (EXT) microphones 120, denoted MIC1 and MIC2, resting on top of table 108. Individual external microphones 120 may be referred to simply as "external" or "individual" microphones. Endpoint 104 may be a wired and/or a wireless communication device equipped with the aforementioned components, such as, but not limited to laptop and tablet computers, smartphones, etc. In a transmit direction, endpoint 104 captures audio/video from talker 106 with microphone array 118 and external microphones 120/VC 112, encodes the captured audio/video into data packets, and transmits the data packets to other endpoints. In a receive direction, endpoint 104 decodes audio/video from data packets received from other endpoints and presents the audio/video to talker 106 via loudspeaker 116/display 114.

Microphone array 118 detects sound impinging on the microphone array to produce a set of microphone signals. Endpoint 104 performs beamforming operations on the set of microphone signals to generate several distinct directional microphone beams BM1-BM5, and point the microphone beams in different directions. Microphone beams BM1-BM5 optimally detect/receive sound arriving at microphone array 118 from the different directions. External microphones 120 are external to, and thus not part of, microphone array 118. External microphones 120 may each be an omnidirectional microphone or a directional microphone. External microphones 120 convert sound impinging on the external microphones into individual audio signals, one per external microphone. More generally, microphone beams BM1-BM5 and external microphones MIC1 and MIC2 may each be referred to individually as a "speech collector," as described further below.

Figure 2:
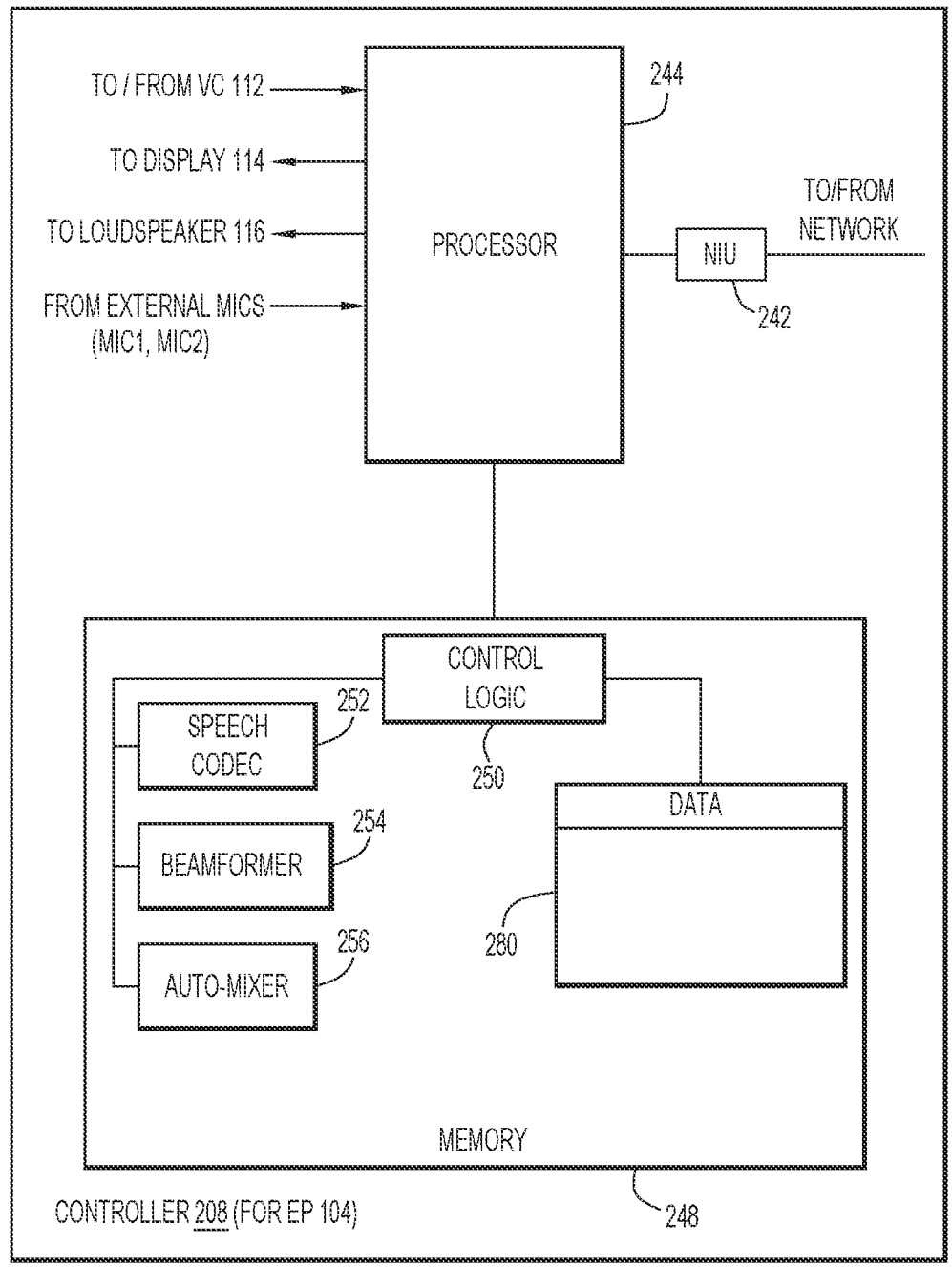
FIG. 2 is block diagram of a controller of the video conference endpoint, according to an example embodiment.

Reference is now made to FIG. 2, which is a block diagram of an example controller 208 of endpoint 104 configured to perform embodiments presented herein. There are numerous possible configurations for controller 208 and FIG. 2 is meant to be an example. Controller 208 includes a network interface unit 242, a processor 244, and memory 248. The aforementioned components of controller 208 may be implemented in hardware, software, firmware, and/or a combination thereof. The network interface (I/F) unit (NIU) 242 is, for example, an Ethernet card or other interface device that allows the controller 208 to communicate over a communication network. Network I/F unit 242 may include wired and/or wireless connection capability.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 112; an audio processor to receive, send, and process audio signals related to loudspeaker 116, microphone array 118, and external microphones 120; and a high-level controller to provide overall control. Portions of memory 248 (and the instructions therein) may be integrated with processor 244. In the transmit direction, processor 244 processes audio/video captured by microphone array 118 and external microphones 120/VC 112, encodes the captured audio/video into data packets, and causes the encoded data packets to be transmitted to communication network. In the receive direction, processor 244 decodes audio/video from data packets received from the communication network and causes the audio/video to be presented to talker 106 via loudspeaker 116/display 114. As used herein, the terms "audio" and "sound" are synonymous and used interchangeably. Also, "voice" and "speech" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for control logic 250 perform operations described herein.

Control logic 250 may include a speech or voice codec 252, a beamformer 254 to form microphone beams BM1-BM5 and point them in desired directions, and an audio auto-mixer 256 (referred to simply as an "auto-mixer 256") to process audio signals captured/collected by and corresponding to microphone beams BM1-BM5 and external microphones 120. In addition, memory 248 stores data 280 used and generated by speech codec 252, beamformer 254, and auto-mixer 256.

Figure 3:
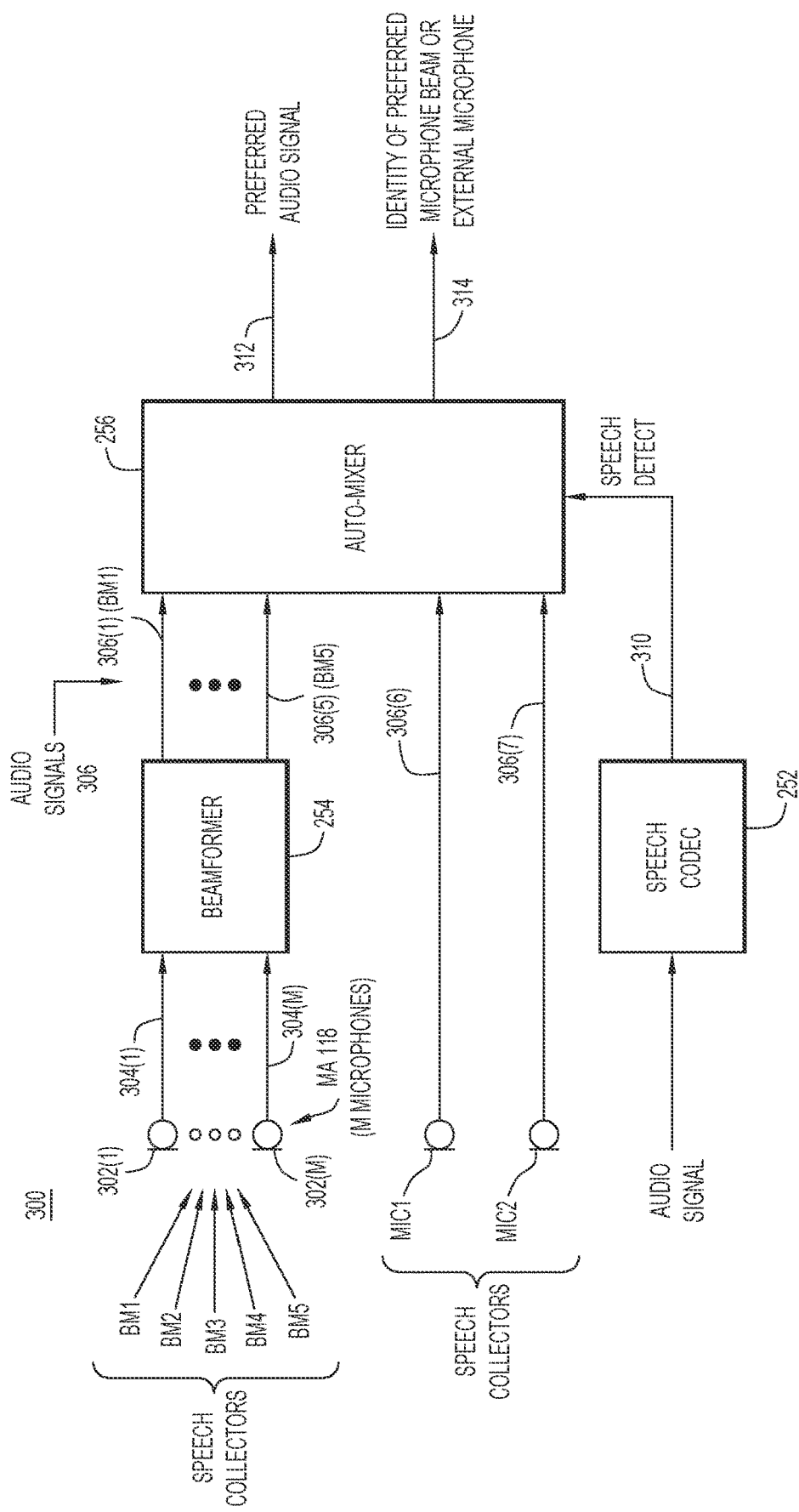
FIG. 3 is a signal processing flow diagram for a speech codec, a beamformer, and an audio automatic (auto)-mixer, implemented in the controller, according to an example embodiment.

With reference to FIG. 3, there is depicted an example signal processing flow 300 for speech codec 252, beamformer 254, and auto-mixer 256. When engaged in conversation, talker 106 originates broadband speech energy in an (audible) audio frequency band from 0-20 kHz, for example. Microphones 302(1)-302(M) (where M>1) of microphone array 118 concurrently detect the speech energy to produce parallel (i.e., concurrent) microphone signals 304(1)-304(M) each from a corresponding one of the microphones in the microphone array.

Beamformer 254 performs audio beam processing of microphone signals 304(1)-304(M) to produce or generate microphone beams BM1-BM5, and converts the broadband speech energy received in/collected by each of the microphone beams BM1-BM5 to corresponding ones of audio signals 306(1)-306(5). For example, audio signal 306(1) conveys the particular/directive speech energy collected by microphone beam BM1, audio signal 306(2) conveys the particular speech energy collected by microphone beam BM2, and so on. Beamformer 254 maintains a mapping of microphone beams BM1-BM5 to corresponding ones of audio signals 306(1)-306(5) produced by the microphone beams. Any known or hereafter developed audio beamforming technique may be used to process microphone signals from a microphone array to form microphone beams and convert speech energy received by the microphone beams into respective audio signals.

Similarly, external microphones MIC1 and MIC2 detect speech energy originated by talker 106 and convert the detected speech energy to corresponding audio signals 306(6) and 306(7). Like audio signals 306(1)-306(5), audio signals 306(6) and 306(7) convey the particular speech energy detected by external microphones MIC1 and MIC2, respectively. Controller 208 maintains a mapping of audio signals 305(6) and 305(7) to external microphones MIC1 and MIC2, respectively. Audio signals 306(1)-306(7) are collectively referred to as "audio signals 306." In addition, audio signals 306(1)-306(5) may be referred to as "microphone beam signals 306(1)-306(5)."

As mentioned above, microphone beams BM1-BM5 and external microphones MIC1 and MIC2 each represent a "speech collector" and collectively represent "speech collectors." Each speech collector (e.g., microphone beam or external microphone) is configured to collect/detect speech originated by talker 106 and convert the collected/detected speech into a corresponding one of the audio signals. Thus, multiple speech collectors collect the speech from talker 106 to produce corresponding ones of the audio signals. Specifically, each microphone beam converts its collected speech to the corresponding audio signal indirectly through the beamformer, while each external microphone converts its collected speech to the corresponding audio signal directly. For a given endpoint, the speech collectors may include any of the following combinations:
  a. One or more microphone beams and one or more external microphones.
  b. Only microphones beams.
  c. Only external microphones.

Speech codec 252 receives an audio signal (e.g., any one of audio signals 306) and encodes successive segments of the audio signal into encoded speech segments to be included in audio packets. Speech codec 252 may include a voice activity detector (VAD) to detect when voice/speech energy is present in the audio signal, i.e., when talker 106 is talking, and to generate a speech present indicator 310 to indicate the same. Speech codec 252 provides speech present indicator 310 to auto-mixer 256. In another arrangement, controller 208 may include, as the VAD, an energy threshold detector configured to receive the audio signal, and to generate speech present indicator 310 when the energy of the audio signal exceeds a threshold. In yet another arrangement, controller 208 may include a machine-learning based VAD to perform a similar function.

Auto-mixer 256 concurrently receives audio signals 306(1)-306(5) that convey/include the speech energy detected by microphone beams BM1-BM5 formed by microphone array 118, respectively. Auto-mixer 256 also concurrently receives audio signals 306(6) and 306(7) that convey the speech energy detected by external microphones MIC1 and MIC2, respectively. As mentioned above, the frequency spectrum of each audio signal includes broadband speech energy in the audio frequency band 0-20 kHz. While speech present indicator 310 indicates the presence of speech, auto-mixer 256 performs frequency-band specific energy analysis on each of audio signals 306(1)-306(7). Based on results of the analysis, auto-mixer 256 determines/selects a preferred audio signal 312 among audio signals 306(1)-306(7), and provides the preferred audio signal to subsequent audio processing stages (e.g., to speech codec 252). Auto-mixer 256 also identifies which of microphone beams BM1-BM5, or which of external microphones MIC1 and MIC2, corresponds to (i.e., is the source of) preferred audio signal 312 based on speech collector-to-audio signal mappings, and generates a signal 314 that identifies the preferred microphone beam or external microphone (i.e., the preferred speech collector). Endpoint 104 uses the preferred speech collector for subsequent sound capture to generate the preferred audio signal.

Figure 4:
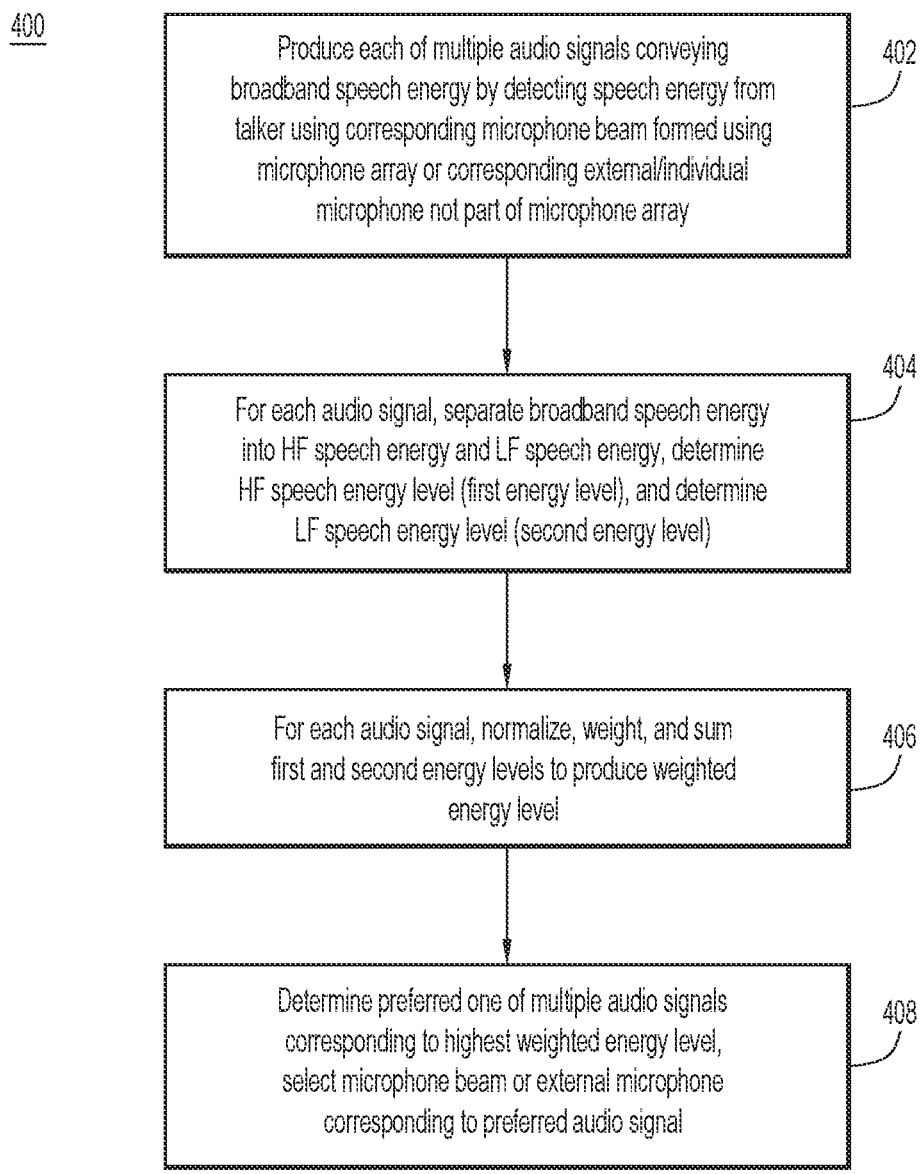
FIG. 4 is a flowchart of a method of auto-mixing according to a first example embodiment.

With reference to FIG. 4, there is a flowchart of an example method 400 of auto-mixing according to a first embodiment. By way of example, method 400 is described with reference to the examples shown in FIGS. 1-3.

At 402, endpoint 104 employs multiple microphone beams BM1-BM5 formed with microphone array 118 under control of beamformer 254, and multiple external microphones MIC1 and MIC2, to capture and convert speech energy originated by talker 106 to corresponding ones of multiple audio signals 306(1)-306(7), that each convey the speech energy. In other words, endpoint 104 produces each audio signal 306(i) by detecting speech energy from talker 106 using a respective one of multiple speech collectors that is either (i) a distinct microphone beam among microphone beams BM1-BM5, or (ii) an external microphone (e.g., MIC1 or MIC2) that is not part of the microphone array. Microphone array 118 may generate more or less than the 5 beams shown herein by way of example. Also, more or less than 2 external microphones may be used. In other arrangements, the endpoint may employ only multiple microphones beams formed by the microphone array to capture/detect sound, or only external microphones to capture/detect the sound.

Auto-mixer 256 receives audio signals 306 and performs next operations 404 and 406 on each audio signal 306(i) to produce results for each audio signal, while speech present indicator 310 indicates that speech is detected in at least one of the audio signals. Each audio signal 306(i) includes "broadband" or "total" speech energy that spans the audio frequency band 0-20 kHz.

At 404, auto-mixer 256 separates the broadband speech energy present in audio signal 306(i) into (i) low-frequency (LF) speech energy in a low-frequency band (also referred to as "low-band speech") that is narrower than 20 kHz and centered on a low frequency, and (ii) high-frequency (HF) speech energy in a high-frequency band (also referred to as "high-band speech") that is narrower than 20 kHz and centered on a high frequency that is greater than the low frequency. In an embodiment, the low-frequency band and the high-frequency band are non-overlapping bands. In another embodiment, the two bands overlap. For example, auto-mixer 256 filters each audio signal 306(i) using (i) a low-frequency bandpass filter (or, alternatively, a low pass filter) having a low-frequency passband centered at the low frequency, to produce the low-frequency speech energy in the low-frequency band, and (ii) a high-frequency bandpass filter (or, alternatively, a high pass filter) having a high-frequency passband centered at the high-frequency and that does not overlap the low-frequency passband, to produce the high-frequency speech energy in the high-frequency band.

The separation of frequencies is performed such that the low-frequency speech energy contains speech energy over a range of low audio frequencies that correspond to utterances of (i.e., voiced or spoken) soft sounds, such as vowels, but does not contain speech energy for utterances of sharp or hard sounds, such as hard consonants, e.g., "s," "t," "p," and the like. Conversely, the high-frequency speech energy contains speech energy over a range of high audio frequencies that correspond to the voiced hard sounds, but does not contain speech energy for the soft sounds. In an example, the low-frequency bandpass filter may have a low-frequency passband (e.g., a 3 dB passband) from 300 Hz-800 Hz, while the high-frequency bandpass filter may have a high-frequency passband from 2 kHz-8 kHz. Other similar low-frequency and high-frequency passbands are possible.

Auto-mixer 256 first determines/detects a first energy level Hi(i) of the separated high-frequency speech energy of audio signal 306(i), and second determines/detects a second energy level Lo(i) of the separated low-frequency speech energy of the audio signal. Any known or hereafter developed technique for detecting a level of audio energy may be used to detect the energy levels Hi(i), Lo(i).

At 406, auto-mixer 256 computes a weighted energy level for audio signal 306(i) based on results from operation 404 in the following manner. Auto-mixer 256 sums the individual high-frequency speech energy of each audio signal 306(i) (post frequency separation) across the audio signals into a total/combined high-frequency energy level Sum_Hi for all of the audio signals combined, and then divides first energy level Hi(i) by total high-frequency energy level Sum_Hi, to produce a first normalized (high-frequency) level for audio signal 306(i). That is, the first energy level is normalized based on the total of the individual high-frequency speech energies across all of the audio signals combined.

Also, auto-mixer 256 sums the individual low-frequency speech energy of each audio signal 306(i) (post frequency separation) across the audio signals into a total/combined low-frequency energy level Sum_Lo for all of the audio signals combined, and then divides second energy level Lo(i) by total low-frequency energy level Sum_Lo, to produce a second normalized (low-frequency) level for audio signal 306(i). That is, the second energy level is normalized based on the total of the low-frequency speech energies across all of the audio signals combined.

Next, auto-mixer 256 (i) weights (e.g., multiplies) the first normalized level with a first weight to produce a first weighed (high-frequency energy) level, (ii) weights the second normalized level with a second weight to produce a second weighted (low-frequency energy) level, and (iii) sums the first weighted level with the second weighted level to produce a weighted energy value or level W(i) of/for audio signal 106(i). In an example, weighted energy level W(i) for audio signal 306(i) is computed as:

$$W(i)=K*Hi(i)/Sum\_Hi+(1-K)*Lo(i)/Sum\_Lo,\text{ where}$$
$$K \text{ and } (1-K) \text{ are weights.}$$

In an example, 0<K<1, and K>1-K (e.g., K=0.6), which weights the high-frequency speech energy (e.g., hard sounds) more heavily than the low-frequency speech energy (e.g., soft sounds).

Operation 406 produces weighted energy levels W(1)-W(7) for (i.e., that correspond to) audio signals 306(1)-306(7). That is, operation 406 produces (i) weighted energy levels W(1)-W(5) for audio signals 306(1)-305(5), which correspond to microphone beams BM1-BM5, respectively, and (ii) weighted energy levels W(6) and W(7) for audio signals 306(6) and 306(7), which corresponding to external microphones MIC1 and MIC2, respectively. Thus, each weighted energy level W(i) corresponds to either a microphone beam or an external microphone (i.e., corresponds to one of a microphone beam and an external microphone).

At 408, auto-mixer 256 compares the weighted energy levels W produced by operation 406 to each other and, based on results of the comparison, third determines/selects, as preferred audio signal 312, an audio signal among audio signals 306 that has/corresponds to a highest weighed energy level among weighted energy levels W. Auto-mixer 256 provides preferred audio signal 312 to subsequent audio processing operations, as described above. In addition, auto-mixer 256 identifies whichever microphone beam or external microphone corresponds to preferred audio signal 312, and selects the identified microphone beam or external microphone as a preferred microphone beam or external microphone to be used to capture sound from room 105.

In summary, the first embodiment selects a microphone beam or an external microphone that corresponds to an audio signal having the best or highest weighted energy level, as opposed to an audio signal having simply a highest energy. The first embodiment derives the weighted energy level based on a weighted sum of energy within two (or more) separate frequency bands. The embodiment may bandpass filter each audio signal using two (or more) filters, (at least) one for low frequencies (e.g., 300 Hz-800 Hz) and (at least) one for high frequencies (e.g., 2 kHz-8 kHz). Next, the first embodiment calculates band-specific signal energy for both bands and normalizes the band-specific signal energy by dividing the band-specific signal energy by a total sum for all energy in the same/specific band (across all audio signals). The first embodiment calculates the weighted energy level as a weighted sum of the normalized band-specific energy within the two (or more) bands with a higher weight on the band for the higher frequencies. The best microphone beam or external microphone is selected based on the weighted energy levels.

The gain for the selected microphone beam or external microphone may be set to 1.0, but an exponential sliding window may be used to smooth transitions between microphone beam or external microphone beam selections. An exponential sliding window may also be used on the weighted energy level for each microphone beam or external microphone. A memory table that stores weighted energy levels may be updated only when speech is present, but the exponential sliding window for the gain may be updated at any time to maintain a stable selection of a microphone beam or an external microphone when speech is not detected. To detect when speech is present, the embodiment may employ an energy threshold, machine learning based voice activity detection, or codec voice detection, for example.

It is also possible to select more than one microphone beams and/or external microphones. In this case, the quality measure includes the frequency weighted energy value described above, but the embodiment selects multiple microphone beams and/or external microphones having the highest frequency weighted energy values (e.g., the two or three highest).

Figure 5:
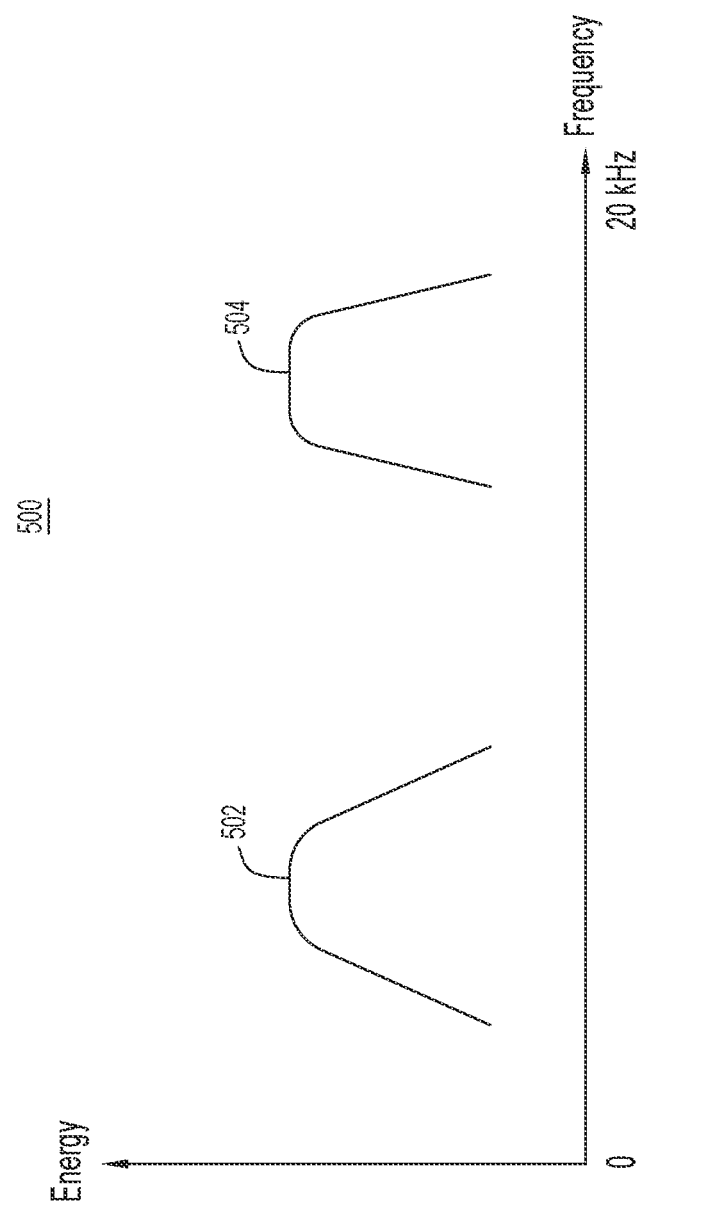
FIG. 5 is an illustration of an audio spectrum for an audio signal that shows separated low-frequency and high-frequency bandpass filter responses that may be used to separate broadband speech energy present in the audio signal, according to an example embodiment.

With reference to FIG. 5, there is an illustration of an example audio spectrum 500 that shows a low-frequency bandpass filter response 502 and a high-frequency bandpass filter response 504 that may be used to separate broadband speech energy of an audio signal between low-frequency speech energy and high-frequency speech energy.

Figure 6:
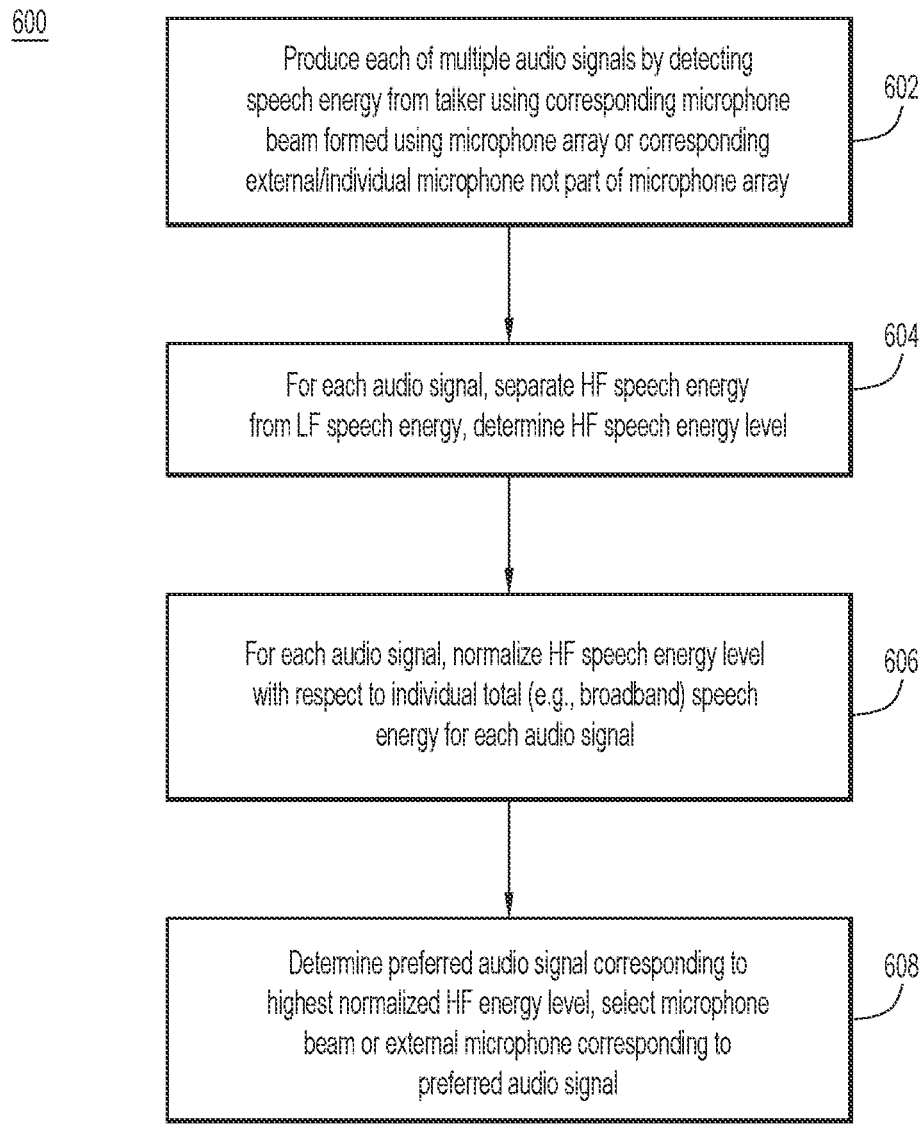
FIG. 6 is a flowchart of a method of auto-mixing according to a second example embodiment.

With reference to FIG. 6, there is a flowchart of an example method 600 of auto-mixing according to a second embodiment.

At 602, endpoint 104 produces, and auto-mixer 256 receives, multiple audio signals 306 that each convey speech energy originated by talker 106, as described above. Each audio signal 306(i) is produced by detecting speech energy from talker 106 using a respective one of multiple speech collectors that is either (i) a distinct microphone beam, or (ii) an external microphone that is not part of the microphone array. Auto-mixer 256 performs next operations 604 and 606 on each audio signal 306(i) while speech is detected.

At 604, auto-mixer 256 separates high-frequency speech energy present in audio signal 306(i) from low-frequency speech energy present in the audio signal, as described above. Auto-mixer 256 determines/detects a first energy level Hi(i) of the high-frequency speech energy of audio signal 306(i).

At 606, auto-mixer 256 computes a normalized (high-frequency) energy level for each audio signal 306(i) in the following manner. Auto-mixer 256 determines the individual total (i.e., broadband) speech energy of each audio signal 306(i) to produce an individual total (broadband) speech energy level Total(i) for the audio signal (i.e., for the individual speech collector that produced that audio signal). The individual total speech energy Total(i) in each audio signal 306(i) includes the broadband speech energy that spans 0-20 kHz before the broadband speech energy is separated into the high-frequency energy and the low-frequency energy. Thus, the individual total speech energy Total(i) in audio signal 306(i) encompasses or includes both its individual high-frequency speech energy and its individual low-frequency speech energy. Next, auto-mixer 256 divides first energy level Hi(i) by individual total speech energy level Total(i) for audio signal 306(i), to produce the normalized level for that audio signal.

Operation 606 produces normalized energy levels for audio signals 306(1)-305(7). Thus, each normalized energy level corresponds to either a microphone beam or an external microphone.

At 608, auto-mixer 256 compares the normalized energy levels produced by operation 606 to each other and, based on results of the comparison, determines/selects, as preferred audio signal 312, an audio signal among audio signals 306 that has/corresponds to a highest normalized energy level among the normalized energy levels produced by operation 606. Auto-mixer 256 provides preferred audio signal 312 to subsequent audio processing operations. In addition, auto-mixer 256 identifies whichever microphone beam or external microphone corresponds to preferred audio signal 312, and selects the identified microphone beam or external microphone as a preferred microphone beam or external microphone to be used to capture sound from room 105.

Figure 7:
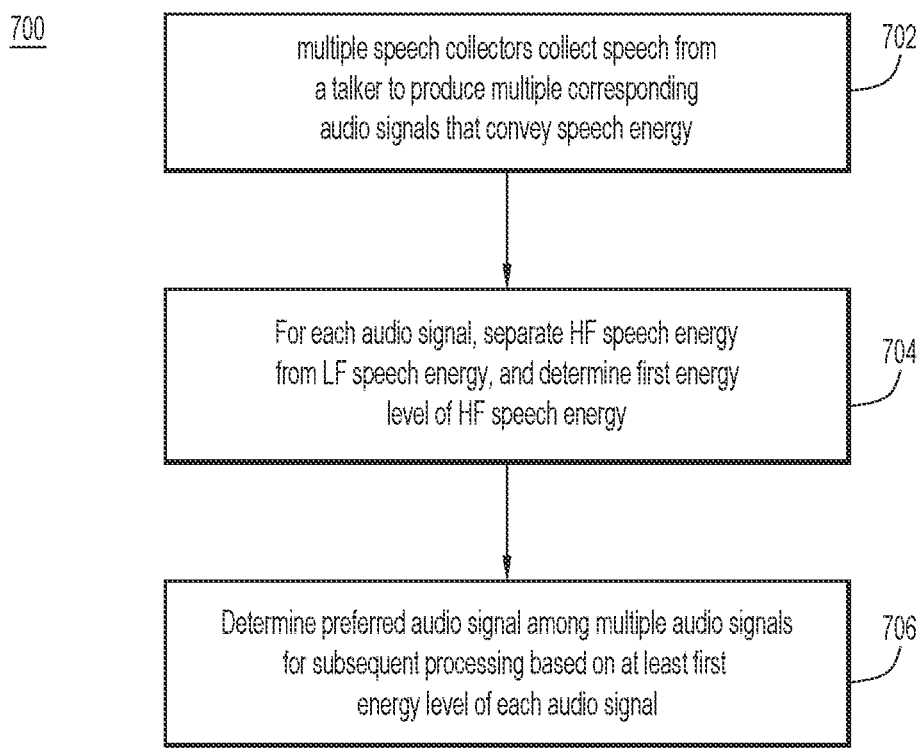
FIG. 7 is a flowchart of a method of generalized auto-mixing, according to an example embodiment.

With reference to FIG. 7, there is a flowchart of an example generalized method 700 of auto-mixing that includes operations described above in connection with the first and second embodiments. Method 700 is performed primarily by a controller (e.g., 208) of an endpoint (e.g., 104) that employs multiple speech collectors as described above.

At 702, endpoint 104 produces multiple audio signals that each convey speech energy. Each audio signal is produced by detecting speech from a talker using a respective one of the multiple speech collectors, which may be (i) a distinct microphone beam generated using a microphone array and beamforming techniques, or (ii) an external microphone that is not part of the microphone array. In other words, multiple speech collectors collect the speech from the talker to produce corresponding ones of the multiple audio signals that each convey respective speech energy (as collected by the corresponding speech collector), and provide the multiple audio signals to the controller.

At 704, for each audio signal/corresponding speech collector, the controller separates high-frequency speech energy from low-frequency speech energy, and determines at least a first energy level of the high-frequency speech energy. In the first embodiment, the controller also determines a second energy level of the low-frequency speech energy.

At 706, the controller determines a preferred audio signal among the multiple audio signals for subsequent processing at least based on the first energy level of each audio signal. In the first embodiment, this includes determining the preferred audio signal based on both the first energy level and the second energy level of each audio signal.

In an embodiment, prior to 706, for each audio signal, the controller determines additional speech energy in one or more of the multiple audio signals, and normalizes the first energy level with respect the additional speech energy, to produce a first normalized energy level for each audio signal. Then, at 706, the controller determines the preferred audio signal at least based on the first normalized energy level of each audio signal. In the first embodiment, the additional speech energy is the sum of the high-frequency speech energies across all of the multiple audio signals combined. In the second embodiment, the additional speech energy for each audio signal is the individual total speech energy of that audio signal.

In summary, embodiments presented herein provide better quality measures for selecting microphone beams or external microphones in settings where participants tend to talk in directions that are not directed toward available microphone beams or external microphones. It is possible to either select only the best microphone beam or external microphone beam (as described above), or to use a known mixing scheme that bases selection on the quality measurement presented above. In an arrangement in which an external microphone is within a critical distance from a talker, the external microphone may be selected over available microphone beams. On the other hand, when the external microphone is outside the critical distance, an available microphone beam may be selected over the external microphone. With respect to reverberation, selecting only one microphone beam or external microphone, may yield the least amount of reverberation. While selecting more than one microphone beam or external microphone may increase the reverberation, selecting two or more microphone beams or external microphones may offer advantages in meetings with rapid discussions between talkers sitting or standing far apart.

Figure 8:
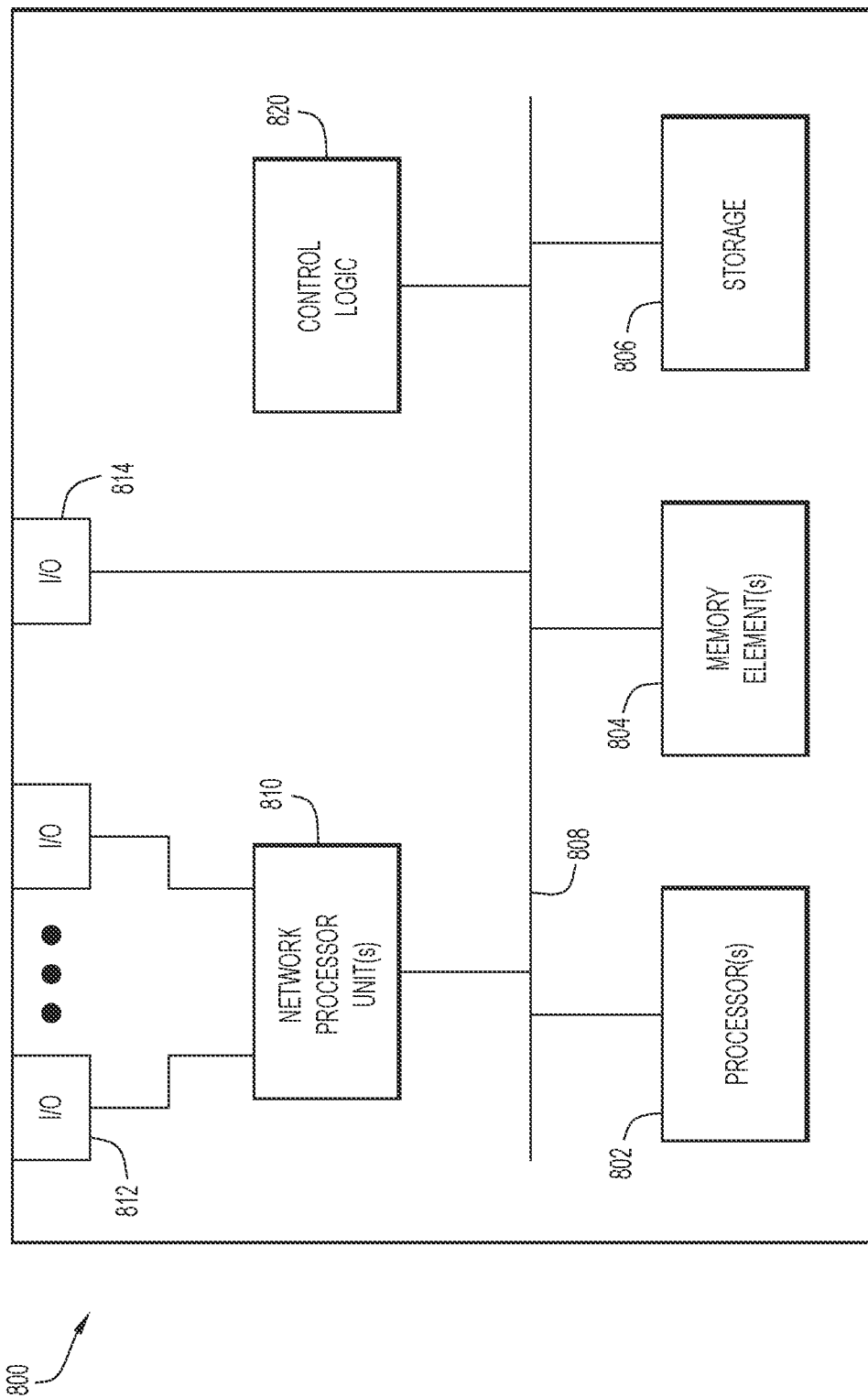
FIG. 8 illustrates a hardware block diagram of a computing device that may perform functions presented herein, according to an example embodiment.

FIG. 8 is a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. Endpoint 104 may be implemented in whole or in part in/by computing device 800. For example, elements described in connection with FIGS. 1-7 may be implemented in computing device 800.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/ antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In some aspects, the techniques described herein relate to a method including: at a system including multiple speech collectors to collect speech from a talker to produce corresponding ones of multiple audio signals that each convey speech energy: for each audio signal: separating high-frequency speech energy from low-frequency speech energy; and determining a first energy level of the high-frequency speech energy; and determining a preferred audio signal among the multiple audio signals for subsequent processing at least based on the first energy level of each audio signal.

In some aspects, the techniques described herein relate to a method, further including: selecting a preferred speech collector among the multiple speech collectors that produced the preferred audio signal.

In some aspects, the techniques described herein relate to a method, wherein each speech collector is one of (i) a microphone beam formed using a microphone array, and (ii) a microphone that is not part of the microphone array.

In some aspects, the techniques described herein relate to a method, wherein the multiple speech collectors include one or more microphone beams formed using the microphone array and one or more microphones that are not part of the microphone array.

In some aspects, the techniques described herein relate to a method, further including: for each audio signal, normalizing the first energy level with respect to additional speech energy from one or more of the multiple audio signals to produce a first normalized energy level, wherein determining the preferred audio signal includes determining the preferred audio signal at least based on each first normalized energy level.

In some aspects, the techniques described herein relate to a method, further including: for each audio signal: determining an individual total speech energy level in each audio signal; and normalizing the first energy level with respect to the individual total speech energy level, to produce a normalized first energy level, wherein determining the preferred audio signal includes determining, as the preferred audio signal, whichever of the multiple audio signals has a highest first normalized energy level.

In some aspects, the techniques described herein relate to a method, further including: for each audio signal, determining a second energy level of the low-frequency speech energy, wherein determining the preferred audio signal is at least based on the first energy level and the second energy level of each audio signal.

In some aspects, the techniques described herein relate to a method, further including: for each audio signal: normalizing the first energy level based on a total of the high-frequency speech energy across the multiple audio signals combined, to produce a first normalized energy level; and normalizing the second energy level based on a total of the low-frequency speech energy across the multiple audio signals combined, to produce a second normalized energy level, wherein determining the preferred audio signal is based on the first normalized energy level and the second normalized energy level of each audio signal.

In some aspects, the techniques described herein relate to a method, further including: for each audio signal: weighting the first normalized energy level to produce a first weighted energy level; weighting the second normalized energy level, to produce a second weighted energy level; and summing the first weighted energy level and the second weighted energy level to produce a weighted energy level, wherein determining the preferred audio signal includes determining, as the preferred audio signal, whichever of the multiple audio signals has a highest weighted energy level.

In some aspects, the techniques described herein relate to a method, wherein separating includes separating such that the high-frequency speech energy contains frequencies for voiced hard consonants and the low-frequency speech energy does not contain frequencies for the voiced hard consonants.

In some aspects, the techniques described herein relate to a method, wherein separating includes separating the high-frequency speech energy into an audio frequency band from 2 kHz to 8 kHz.

In some aspects, the techniques described herein relate to an apparatus including: multiple speech collectors configured to collect speech from a talker to produce corresponding ones of multiple audio signals that each convey speech energy; and a controller coupled to the multiple speech collectors and configured to perform: for each audio signal: separating high-frequency speech energy from low-frequency speech energy; and determining a first energy level of the high-frequency speech energy; and determining a preferred audio signal among the multiple audio signals for subsequent processing at least based on the first energy level of each audio signal.

In some aspects, the techniques described herein relate to an apparatus, wherein each speech collector is one of (i) a microphone beam formed using a microphone array, and (ii) a microphone that is not part of the microphone array.

In some aspects, the techniques described herein relate to an apparatus, wherein the multiple speech collectors include one or more microphone beams formed using the microphone array and one or more microphones that are not part of the microphone array.

In some aspects, the techniques described herein relate to an apparatus, further including: for each audio signal: determining an individual total speech energy level in each audio signal; and normalizing the first energy level with respect to the individual total speech energy level, to produce a normalized first energy level, wherein determining the preferred audio signal includes determining, as the preferred audio signal, whichever of the multiple audio signals has a highest first normalized energy level.

In some aspects, the techniques described herein relate to an apparatus, further including: for each audio signal, determining a second energy level of the low-frequency speech energy, wherein determining the preferred audio signal is at least based on the first energy level and the second energy level of each audio signal.

In some aspects, the techniques described herein relate to an apparatus, further including: for each audio signal: normalizing the first energy level based on a total of the high-frequency speech energy across the multiple audio signals combined, to produce a first normalized energy level; and normalizing the second energy level based on a total of the low-frequency speech energy across the multiple audio signals combined, to produce a second normalized energy level, wherein determining the preferred audio signal is based on the first normalized energy level and the second normalized energy level of each audio signal.

In some aspects, the techniques described herein relate to a non-transitory computer readable medium encoded with instructions that, when executed by a controller of a system that includes multiple speech collectors configured to collect speech from a talker to produce corresponding ones of multiple audio signals that each convey speech energy, cause the controller to perform: for each audio signal: separating high-frequency speech energy from low-frequency speech energy; and determining a first energy level of the high-frequency speech energy; and determining a preferred audio signal among the multiple audio signals for subsequent processing at least based on the first energy level of each audio signal.

In some aspects, the techniques described herein relate to a non-transitory computer readable medium, wherein each speech collector is one of (i) a microphone beam formed using a microphone array, and (ii) a microphone that is not part of the microphone array.

In some aspects, the techniques described herein relate to a non-transitory computer readable medium, further including: for each audio signal, normalizing the first energy level with respect to additional speech energy from one or more of the multiple audio signals to produce a first normalized energy level, wherein determining the preferred audio signal includes determining the preferred audio signal at least based on each first normalized energy level.

The above description is intended by way of example only. Various modifications and structural changes may be made therein without departing from the scope of the concepts described herein and within the scope and range of equivalents of the claims.

What is claimed is:

1. A method comprising:
at a controller of a system that includes speech collectors to convert speech from a talker to corresponding ones of audio signals that each convey speech energy:
performing signal processing on each audio signal by:
filtering the speech energy into high-frequency speech energy and low-frequency speech energy;
determining a high-frequency energy level of the high-frequency speech energy;
determining a low-frequency energy level of the low-frequency speech energy;
normalizing the high-frequency energy level with respect to a first sum of the high-frequency speech energy across the audio signals, to produce a normalized high-frequency energy level;
normalizing the low-frequency energy level with respect to a second sum of the low-frequency speech energy across the audio signals, to produce a normalized low-frequency energy level;
weighting each of the normalized high-frequency energy level and the normalized low-frequency energy level to produce a weighted normalized high-frequency energy level and a weighted normalized low-frequency energy level; and
summing the weighted normalized high-frequency energy level and the weighted normalized low-frequency energy level to produce an individual energy level; and
selecting as a preferred audio signal whichever of the audio signals has a highest individual energy level for encoding into a data packet.

2. The method of claim 1, further comprising:
selecting a preferred speech collector among the speech collectors that produced the preferred audio signal.

3. The method of claim 1, wherein each speech collector is one of (i) a microphone beam formed using a microphone array, and (ii) a microphone that is not part of the microphone array.

4. The method of claim 3, wherein the speech collectors include one or more microphone beams formed using the microphone array and one or more microphones that are not part of the microphone array.

5. The method of claim 1, wherein:
the speech energy spans a frequency band of 0 kHz to 20 kHz.

6. The method of claim 1, wherein filtering includes filtering such that the high-frequency speech energy contains frequencies for voiced hard consonants and the low-frequency speech energy does not contain the frequencies for the voiced hard consonants.

7. The method of claim 1, wherein filtering includes filtering the high-frequency speech energy into an audio frequency band from 2 kHz to 8 kHz.

8. The method of claim 1, wherein:
the weighted normalized high-frequency energy level is weighted more heavily than the weighted normalized low-frequency energy level.

9. The method of claim 1, wherein:
filtering includes filtering such that the high-frequency speech energy contains voiced hard sounds and the low-frequency speech energy contains voiced soft sounds.

10. The method of claim 1, wherein:
filtering includes using a high-frequency bandpass filter to produce the high-frequency speech energy and a low-frequency bandpass filter to produce the low-frequency speech energy.

11. The method of claim 1, further comprising:
receiving an indicator that indicates a presence of the speech; and
performing the signal processing of each audio signal while the indicator indicates the presence of the speech.

12. An apparatus comprising:
speech collectors to convert speech from a talker to corresponding ones of audio signals that each convey speech energy; and
a controller coupled to the speech collectors and configured to perform:
signal processing on each audio signal by:
filtering the speech energy into high-frequency speech energy and low-frequency speech energy;
determining a high-frequency energy level of the high-frequency speech energy;
determining a low-frequency energy level of the low-frequency speech energy;
normalizing the high-frequency energy level with respect to a first sum of the high-frequency speech energy across the audio signals, to produce a normalized high-frequency energy level;
normalizing the low-frequency energy level with respect to a second sum of the low-frequency speech energy across the audio signals, to produce a normalized low-frequency energy level;
weighting each of the normalized high-frequency energy level and the normalized low-frequency energy level to produce a weighted normalized high-frequency energy level and a weighted normalized low-frequency energy level; and
summing the weighted normalized high-frequency energy level and the weighted normalized low-frequency energy level to produce an individual energy level; and
selecting as a preferred audio signal whichever of the audio signals has a highest individual energy level for encoding into a data packet.

13. The apparatus of claim 12, wherein each speech collector is one of (i) a microphone beam formed using a microphone array, and (ii) a microphone that is not part of the microphone array.

14. The apparatus of claim 13, wherein the speech collectors include one or more microphone beams formed using the microphone array and one or more microphones that are not part of the microphone array.

15. The apparatus of claim 12, wherein:
the speech energy spans a frequency band of 0 kHz to 20 kHz.

16. The apparatus of claim 12, wherein the weighted normalized high-frequency energy level is weighted more heavily than the weighted normalized low-frequency energy level.

17. A non-transitory computer readable medium encoded with instructions that, when executed by a controller of a system that includes speech collectors configured to convert speech from a talker to corresponding ones of audio signals that each convey speech energy, cause the controller to perform:
performing signal processing on each audio signal by:
filtering the speech energy into high-frequency speech energy and low-frequency speech energy;

determining a high-frequency energy level of the high-frequency speech energy;

determining a low-frequency energy level of the low-frequency speech energy;

normalizing the high-frequency energy level with respect to a first sum of the high-frequency speech energy across the audio signals, to produce a normalized high-frequency energy level;

normalizing the low-frequency energy level with respect to a second sum of the low-frequency speech energy across the audio signals, to produce a normalized low-frequency energy level;

weighting each of the normalized high-frequency energy level and the normalized low-frequency energy level to produce a weighted normalized high-frequency energy level and a weighted normalized low-frequency energy level; and summing the weighted normalized high-frequency energy level and the weighted normalized low-frequency energy level to produce an individual energy level; and selecting as a preferred audio signal whichever of the audio signals has a highest individual energy level for encoding into a data packet.

18. The non-transitory computer readable medium of claim 17, wherein each speech collector is one of (i) a microphone beam formed using a microphone array, and (ii) a microphone that is not part of the microphone array.

19. The non-transitory computer readable medium of claim 17, wherein:

the speech energy spans a frequency band of 0 kHz to 20 kHz.

20. The non-transitory computer readable medium of claim 17, wherein:

the weighted normalized high-frequency energy level is weighted more heavily than the weighted normalized low-frequency energy level.

* * * * *